United States Patent
Kottapalli

(10) Patent No.: US 11,134,099 B2
(45) Date of Patent: Sep. 28, 2021

(54) THREAT RESPONSE IN A MULTI-ROUTER ENVIRONMENT

(71) Applicant: VMWARE, INC., Palo Alto, CA (US)

(72) Inventor: Ravi Kumar Reddy Kottapalli, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 198 days.

(21) Appl. No.: 16/383,712

(22) Filed: Apr. 15, 2019

(65) Prior Publication Data

US 2020/0236132 A1 Jul. 23, 2020

(30) Foreign Application Priority Data

Jan. 23, 2019 (IN) .............................. 201941002841

(51) Int. Cl.
*H04L 29/06* (2006.01)
*H04L 12/751* (2013.01)
*H04L 29/12* (2006.01)

(52) U.S. Cl.
CPC .......... *H04L 63/1441* (2013.01); *H04L 45/02* (2013.01); *H04L 63/101* (2013.01); *H04L 63/1408* (2013.01); *H04L 61/6068* (2013.01)

(58) Field of Classification Search
CPC ....................... H04L 63/1441; H04L 63/1408; H04L 63/101
See application file for complete search history.

(56) References Cited

U.S. PATENT DOCUMENTS

| | | | |
|---|---|---|---|
| 2003/0043853 A1* | 3/2003 | Doyle | H04L 61/10 370/489 |
| 2006/0047769 A1* | 3/2006 | Davis | G06Q 10/107 709/207 |
| 2007/0192847 A1* | 8/2007 | Yeom | H04L 63/0227 726/12 |
| 2015/0188937 A1* | 7/2015 | Wu | H04L 63/1416 726/22 |
| 2017/0272465 A1* | 9/2017 | Steele | H04L 63/107 |

* cited by examiner

*Primary Examiner* — Ali S Abyaneh

(57) ABSTRACT

Systems, methods, and software to implement network configuration updates in a computing network. In one implementation, a method includes identifying a threat related to an internet protocol (IP) address, wherein the IP address corresponds to a computing node in the computing network. After identifying the threat, the method further includes generates one or more routing update packets that indicate a block request for at least the IP address. Once generated, the method also provides communicating the one or more routing update packets to one or more routers in the computing network.

18 Claims, 7 Drawing Sheets

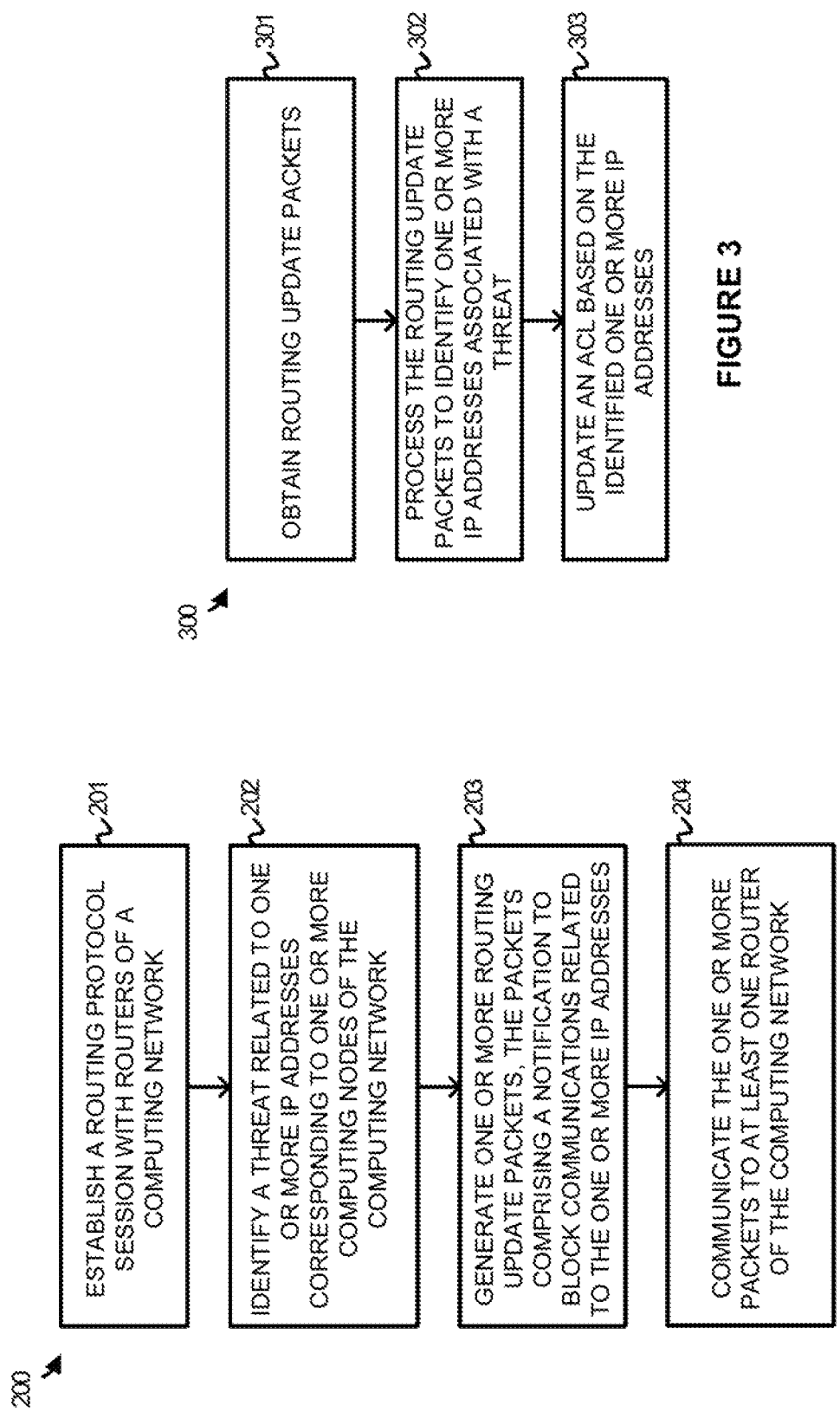

THREAT RESPONSE IN A MULTI-ROUTER ENVIRONMENT

RELATED APPLICATIONS

Benefit is claimed under 35 U.S.C. 119(a)-(d) to Foreign Application Serial No. 201941002841 filed in India entitled "THREAT RESPONSE IN A MULTI-ROUTER ENVIRONMENT", on Jan. 23, 2019, by VMWARE, INC., which is herein incorporated in its entirety by reference for all purposes.

TECHNICAL BACKGROUND

In computing environments, software defined networks may be used that comprise software modules capable of providing a communication platform for one or more virtual nodes in the computing environment. The software defined networks, which may include logical switches, routers, distributed firewalls, and the like, may be used to intelligently direct communication on the network by inspecting packets before passing them to other compute nodes. For example, packets may be inspected to determine the source and destination internet protocol (IP) addresses to determine if the communication is permitted to be delivered to the destination compute node. In some implementations, software defined networks may be designed with packet forwarding configurations that indicate actions to be taken against each communicated packet. The packet forwarding configurations may identify specific attributes, such as IP addresses, media access control (MAC) addresses, and the like, within the data packet and, when identified, provide a set of actions to be asserted against the data packet. These actions may include modifications to the data packet, and forwarding rules for the data packet, amongst other possible operations.

In some implementations, computing environments, such as those employed for an organization, may include branch gateways or routers that can be used to communicate packets between the organization's various computing sites as part of a Wide Area Network (WAN). These routers may provide network services such as static routing, virtual private networking, load balancing, firewall and security operations, Dynamic Host Configuration Protocol (DHCP), and network address translation. As an example, an organization may employ a central computing site or software defined data center that provides applications and services to other computing sites via branch routers at the other computing sites. However, while the use of branch routers permits an organization to communicate from various computing sites, the management and configuration of the branch routers can be difficult and cumbersome. These difficulties are compounded when routers of a network are sourced from various providers that each require a unique series of commands to update the configuration of the routers.

SUMMARY

The technology described herein enhances threat response in a multi-router environment. In one implementation, a method of implementing network configuration updates in a computing network includes identifying a threat related to an internet protocol (IP) address, wherein the IP address corresponds to a compute node in the computing network. The method further includes, in response to identifying the threat, generating one or more routing update packets, the one or more routing update packets comprising a notification to block communications related to at least the IP address. The method also includes communicating the one or more routing update packets to one or more routers in the computing network.

BRIEF DESCRIPTION OF THE DRAWINGS

FIG. 2 illustrates an operation of configuration service to manage blocklists in a computing network according to an implementation.

FIG. 3 illustrates an operation of a router to implement a block request according to an implementation.

DETAILED DESCRIPTION

Figure 1:
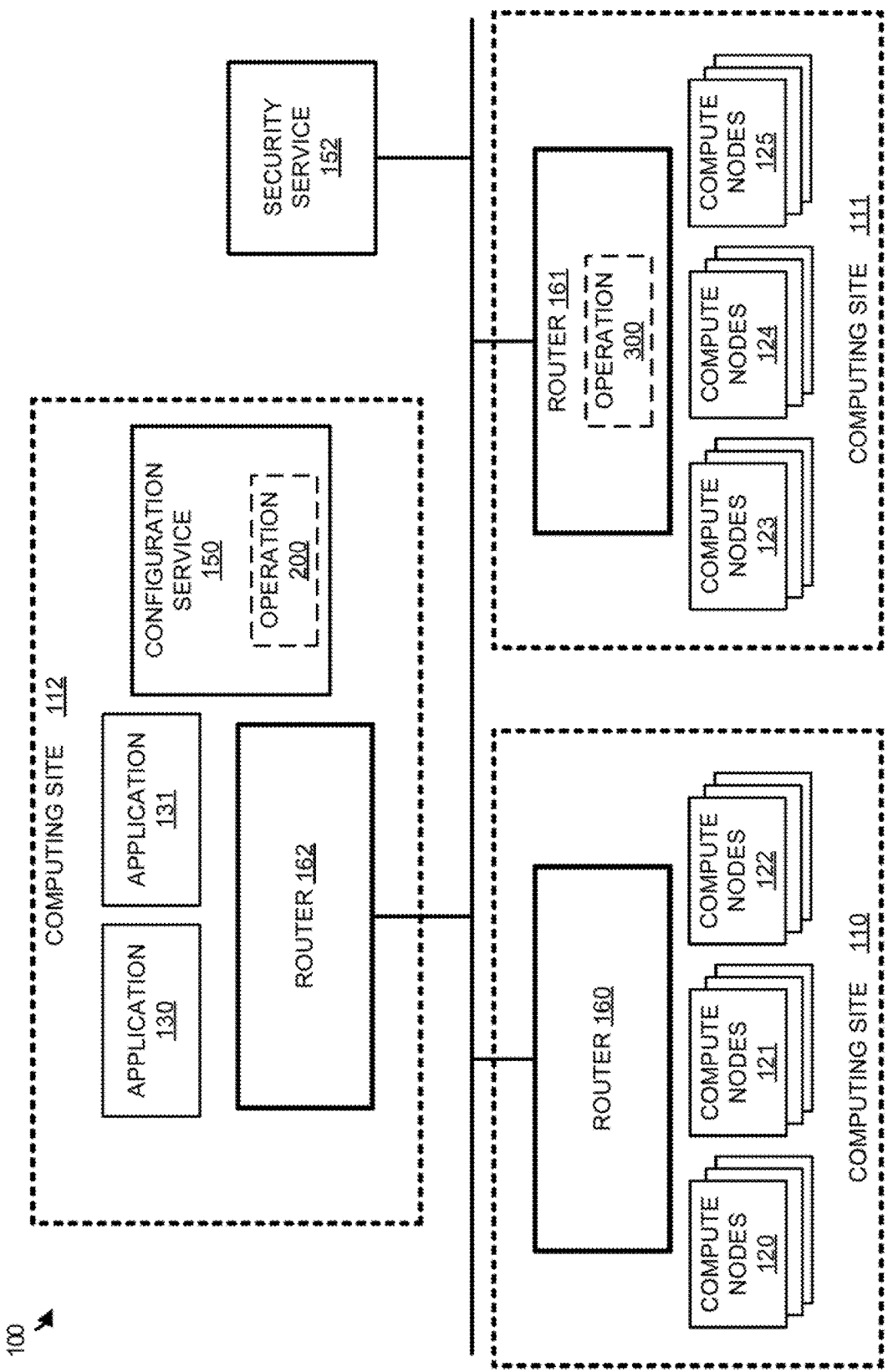
FIG. 1 illustrates computing network according to an implementation.

FIG. 1 illustrates a computing network 100 according to an implementation. Computing network 100 includes computing sites 110-112 and security service 152. Computing sites 110-111 includes corresponding routers 160-161 and compute nodes 120-125, wherein compute nodes 120-125 may comprise physical computing systems, virtual machines, containers, or some other similar compute nodes. Computing site 112 includes applications 130-131, communication service 150, and router 162. Configuration service 150 provides operation 200 that is further described in FIG. 2 and router 161 provides operation 300 that is further described in FIG. 3. Computing site 112 may be representative of a central office computing site or a software defined data center for an organization in some examples. Computing sites 110-111 may be representative of branch computing sites for an organization in some examples.

As depicted, an organization may deploy computing network 100 to provide computing services across multiple computing sites 110-112. In providing connectivity between the various computing sites, each of the computing sites includes a router of routers 160-162, where the routers may be used to provide a wide area network (WAN) for the organization. In some implementations, each of the routers may be provided with a configuration, which may define the applications, services, and compute nodes that are permitted to communicate in the network. Compute nodes 120-125 may comprise virtual machines, containers, physical computing devices, or some other type of computing element. Applications 130-131 may comprise database applications, data processing applications, or some other type of application that may execute one or more compute nodes.

In managing the communication configuration for routers 160-162, routers 160-162 may include access control lists (ACLs) that are used in filtering packets as they are communicated between the various elements in computing network 100. For example, router 160 may be configured to permit compute nodes 120-121 to communicate with applications 130-131, while limiting compute nodes 122 to communicating with only application 131. While demonstrated in the previous example as defining rules for communicating with applications, router 160 may also be provided with rules limiting the communications with other compute nodes of network 100. In defining the communication rules for the various routers, computing network 100 includes configuration service 150, wherein configuration service 150 may distribute configuration information to the various routers of computing network 100.

Here, in addition to computing sites 110-112 of computing network 100, computing network 100 further includes security service 152 that is used to identify security incidents and threats based on packet monitoring of the communications in the network. In some implementations, security service 152 may comprise an Intrusion Detection System (IDS), wherein the IDS may collect packets using NetFlow, IP Flow Information Export (IPFIX), or some other packet mirroring operation. When a threat is identified from the packet monitoring, security service 152 may generate a notification that is supplied to configuration service 150, where the notification may indicate attributes of the threat including the source internet protocol (IP) address of the threat, the destination application or address of the threat, or any other similar information about the threat. Once the information is obtained, configuration service 150 may initiate an operation to configure routers 160-162 to limit or block communications associated with the attributes. For example, if a compute node in compute nodes 120 was identified as causing a threat in communicating with application 130, configuration service 150 may generate a configuration modification, such that the compute node may be blocked from communicating with at least application 130. In some examples, configuration service 150 may further limit communications from all compute nodes that share a prefix or subnet. Thus, while a single compute node may be identified as being associated with the threat, all of the compute nodes associated with IP prefix or subnet may be blocked from communicating with the application.

FIG. 2 illustrates an operation 200 of configuration service to manage blocklists in a computing network according to an implementation. The processes of operation 200 are referenced parenthetically in the paragraphs that follow with reference to the systems and elements of computing network 100 of FIG. 1. Although illustrated separate from router 162, it should be understood that at least a portion of the operations for configuration service 150 may be implemented as part of router 162.

In operation, configuration service 150 establishes (201) a routing protocol session with one or more routers of computing network 100. This routing protocol session may comprise a Border Gateway Protocol (BGP) session, an Open Shortest Path First (OSPF) session, or some other similar routing protocol session. Once established, configuration service 150 may identify (202) a threat related to one or more IP addresses corresponding to one or more compute nodes of computing network 100. In identifying the threats in computing network 100, security service 152 may provide packet monitoring services capable of identifying various threats in computing network 100. In at least one implementation, security service 152 may represent an IDS that is capable of obtaining mirrored packets that are communicated between the various routers of computing sites 110-112. For example, when a packet is communicated from a compute node of compute nodes 123 to application 130, a mirrored packet may also be provided to security service 152. Once the packet is obtained, security service 152 may process the packet to determine if the packet is malicious based on attributes of the packet, including addressing attributes, header attributes, protocol type, or some other similar information from the packet. If the packet is determined to be malicious, security service 152 may communicate a notification to configuration service 150 indicating the threat from the associated IP address.

Once a threat is identified for an IP address in computing network 100, configuration service 150 generates (203) one or more routing update packets, wherein the packets comprise a notification to block communications related to the one or more IP addresses, and further communicates (204) the one or more routing update packets to at least one router of computing network 100 using the established routing protocol sessions. In some implementations, configuration service 150 may maintain a data structure that identifies IP addresses and a corresponding router address to update a configuration for the router. Referring to the example of a threat identified from a compute node of compute nodes 123, configuration service 150 may determine that the compute node originates from router 161. Consequently, a routing update packet may be generated and communicated to router 161, wherein the packet may encapsulate information to block packets from at least the compute node. In some implementations, in addition to blocking a single compute node, configuration service 150 may further maintain information about the subnets or IP ranges for the compute nodes in the network. For example, compute nodes 123-125 may each correspond to a different subnet. As a result, when a threat is identified in compute nodes 123, configuration service 150 may generate a packet with a request to block communications related to the IP addresses of compute nodes 123.

FIG. 3 illustrates an operation 300 of a router to implement a block request according to an implementation. The processes of operation 300 are referenced parenthetically in the paragraphs that follow with reference to systems and elements of computing network 100 of FIG. 1. Although demonstrated as being implemented in router 161, it should be understood that similar operations may be provided by router 160.

As described herein, configuration service 150 may identify a threat associated with an IP address in computing network 100 and generate a routing update packet that encapsulates a request to update ACLs to block communications related to the packet. For example, if a compute node in compute nodes 123 were to generate a communication that was identified as potentially malicious by security service 152, security service 152 may notify configuration service 150 of the incident and configuration service 150 may generate a routing update packet indicating that at least the compute node should be blocked from future communications. Once the routing update packet is generated, the packet may be communicated to at least one router in the computing network, wherein the router may comprise the router associated with the compute node, may comprise all of the routers in the computing network, or may comprise routers that could potentially be communicated with by the affected compute node. Here, router 161 obtains (301) the one or more routing update packets generated by configuration service 150, the routing update packets communicated using the routing protocol session, and processes (302) the one or more routing update packets to identify one or more IP addresses associated with the threat. In some implementations, router 161 may perform packet inspection capable of identify information within the header of the routing update packets, wherein the information may indicate one or more IP addresses that should be blocked via at least one ACL. Once the one or more IP addresses are identified, router 161 may update (303) at least one ACL based on the identified one or more IP addresses.

Returning to the example of threat from a compute node in compute nodes 123, router 161 may process a routing packet obtained from configuration service 150 to identify one or more IP addresses associated with at least the affected compute node. Once identified, router 161 may update at least one ACL of the router based on the IP information. This ACL may maintain information about allowed communications, may maintain information about blocked IP addresses, or may maintain any other similar routing information for compute nodes in computing network 100. Once the at least one ACL is updated, router 161 may identify egress and ingress packets related to the affected IP address and block the communications based on the updated ACL(s). In some implementations, the routing update packet obtained from configuration service may indicate a range or subnet of IP addresses to be blocked from communications. Thus, if compute nodes 123 corresponded to a subnet of IP addresses coupled to router 161, the routing update packet may provide a request to block all communications related to the subset of IP addresses. Accordingly, if a compute node of compute nodes 123 attempted a communication with application 130 of computing site 112, router 161 may block the communication based on the updated ACLs.

Although demonstrated in the examples of operation 200 and operation 300 as providing the update directly from configuration service 150, it should be understood that a WAN orchestrator may be used as an intermediary between configuration service 150 and the various routers of computing network 100. In particular when a threat is identified by configuration service 150, configuration service 150 may generate a notification that is provided to the WAN orchestrator, wherein the notification may indicate the IP address or range of addresses associated with the threat and may further provide an IP address for configuration of the associated router. Once provided the WAN orchestrator may update the configuration of one or more routers in computing network 100 to satisfy the blocking requirements.

Although demonstrated in the examples of FIGS. 2 and 3 as operating within a single computing site of a computing network, it should be understood that configuration service 150 may operate in multiple computing sites of a computing network. In particular, when a threat is identified for any of computing sites 110-112, a configurations service may generate a routing update packet and communicate the routing update packet to one or more other routers in the network. Advantageously, rather than using application programming interfaces (APIs) or command line interfaces (CLIs) that are unique to hardware providers, a routing update packet may be delivered using an established routing protocol session to update ACLs across the various hardware providers. Further, while demonstrated as separate from computing site 112, it should be understood that security service 152 may be incorporated in computing site 112 and, in some examples, configuration service 150.

Figure 4A:
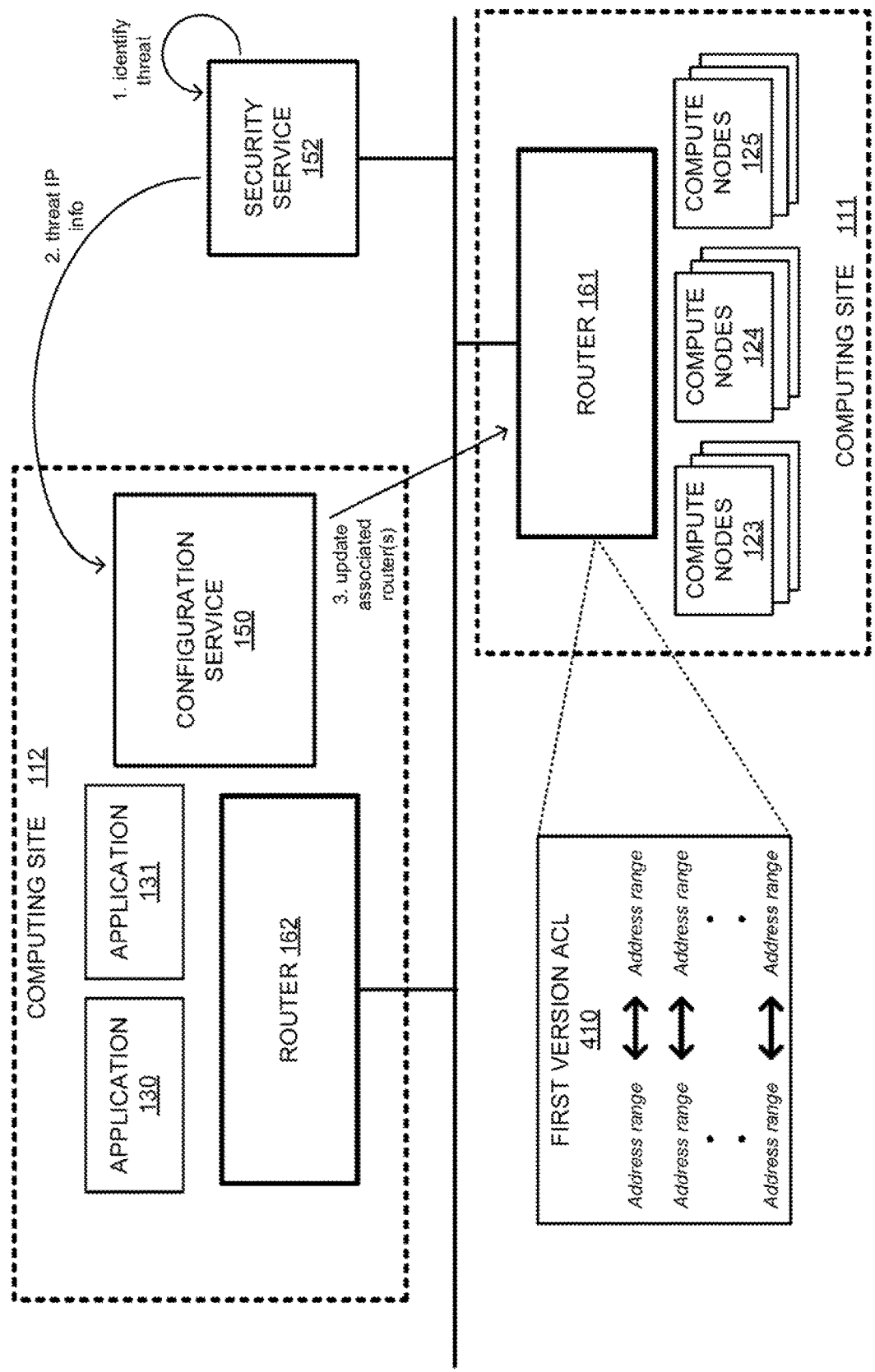
FIGS. 4A and 4B illustrates an operational scenario of updating a blocklist in a computing network according to an implementation.
Figure 4B:
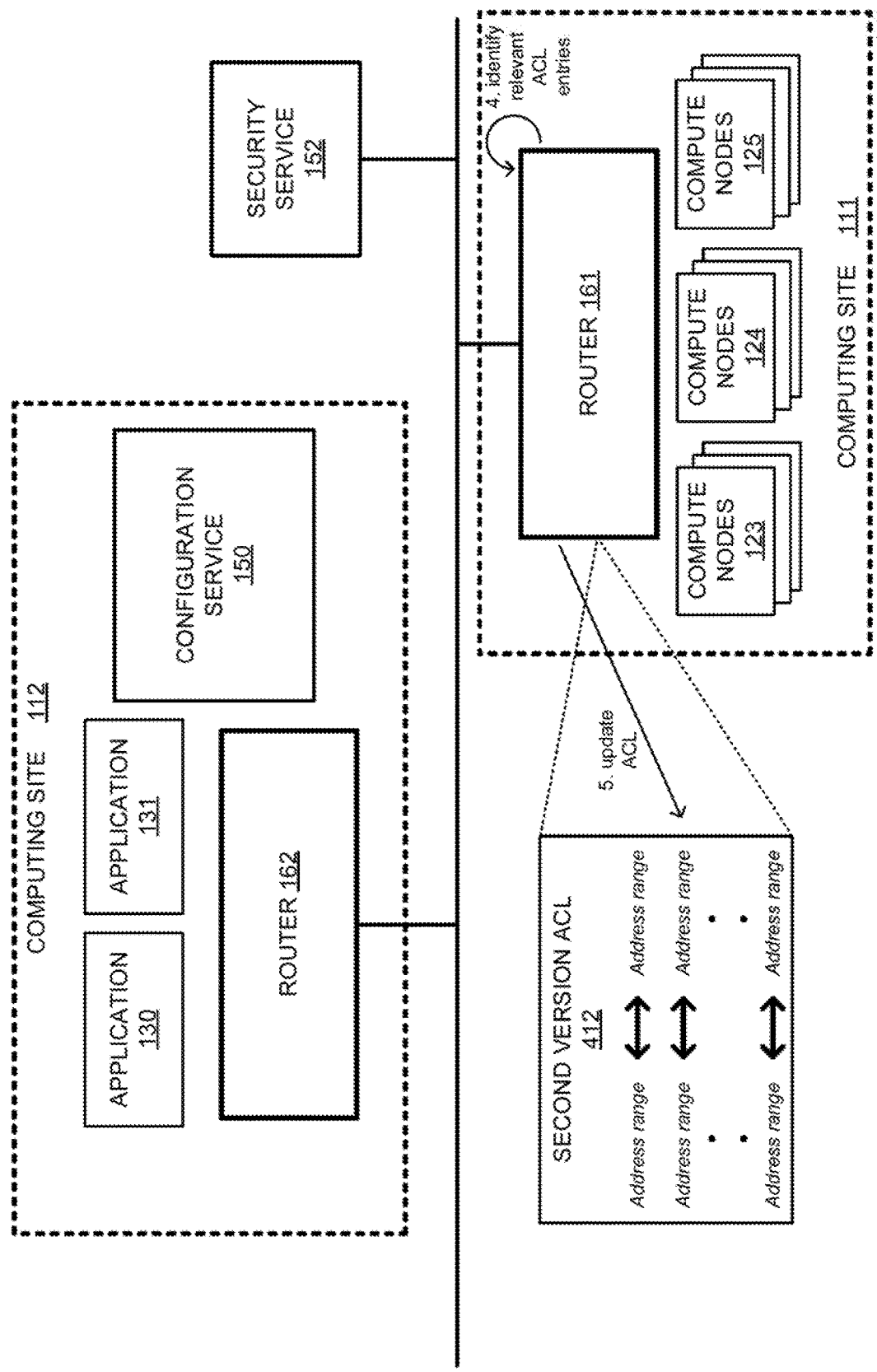

FIGS. 4A and 4B illustrates an operational scenario of updating a blocklist in a computing network according to an implementation. FIGS. 4A and 4B include systems and elements from computing network 100 of FIG. 1, however, computing site 110 has been omitted for clarity. FIG. 4A further includes first version ACL 410 and FIG. 4B further includes second version ACL 412, wherein second version ACL 412 is updated via at least one routing update packet from configuration service 150.

Referring first to FIG. 4A, security service 152 identifies, at step 1, a threat using packet monitoring for the computing network. In some implementations, NetFlow, IPFIX or some other similar operation may be used to mirror communications communicated over the routers in the network and communicate the packets to security service 152. Once communicated, security service 152 may perform packet inspection to identify various traits of the packet, including header information of the packet, protocol information of the packet, or some other similar information of the packet and use the traits to determine whether the packet contains a possible threat. In some examples, security service 152, which may comprise an IDS, may compare the traits of the identified packets with expected packet traits, and when a packet or packets deviate from expected traits, identify the communication as potentially malicious. When a threat is identified by security service 152, information about the threat is communicated, at step 2, to configuration service 150, wherein the information may include a source IP address information associated with the threat, a destination IP address associated with the threat, or some other information related to the threat. As an example, compute nodes 123-125 may communicate with application 130 that provides database functionality for compute nodes 123-125. As the compute nodes communicate with application 130, security service 152 may monitor the packet interactions and identify when a threat is associated with communications by at least one of the compute nodes. Once identified information about the threat can be provided to configuration service 150.

After configuration service 150 obtains and identifies the threat in the computing network, configuration service 150 updates, at step 3, router(s) associated with the threat. In some implementations, configuration service 150 may maintain information about the compute node IP addresses that are associated with each router in computing network 100. For example, when a threat is identified for a compute node of compute nodes 123, configuration service 150 may determine which of the routers is associated with the IP address for the compute node. Once the appropriate router is identified, configurations service 150 may generate and communicate a routing update packet to router 161 indicating that the at least one IP address associated with the threat should be blocked from future communications. In some examples, the routing update may be provided as an ACL update that can be parsed by the receiving router to update its configuration, wherein the routing update may be communicated using BGP, OSPF, or some other similar protocol.

Turning to FIG. 4B, once a packet is obtained from configuration service 150 via router 162, router 161 may identify, at step 4, relevant ACL entries that correspond to the included IP addressing information from the packet. In some implementations, router 161 may maintain ACLs that are used to identify available communication paths for the compute nodes connected to router 161. If a communication path is unavailable or is identified as blocked, then router 161 may prevent an incoming or outgoing communication associated with the compute node. Here, in response to receiving the packet from computing site 112, router 161 may update, at step 5, first version ACL 410 to second version ACL 412. In some implementations, the identification of the update may include removing entries from an approved communication list, such as a list that identifies available resources to each of the compute nodes. As a result, when the request is identified, router 161 may remove any entries in the list that correspond to the affected compute nodes. In other implementations, rather than updating the configuration of permitted communications, the ACL may represent a list of blocked IP addresses that are prevented from communicating egress or ingress packets. As a result, when a communication is generated from a compute node associated with the threat, router 161 may use second version ACL 412 to determine that the communications are blocked and prevent the communications from being communicated over the network. In this manner, router 161 may update information about permitted communications using a routing update packet rather than operations that are specific to the individual router.

Although demonstrated in the example as obtaining the routing update packet directly from computing site 112, in some examples, computing site 112 may transfer a communication to a WAN orchestrator associated with computing network 100. In particular, rather than directly communicating with the individual routers to update the routers based on a threat, configuration service 150 may generate a packet that indicates the address or addresses that should be blocked or prevented from future communication. As a result, if a compute node of compute nodes 123 were identified as a threat to applications 130-131 or to any other compute node in the computing network, then a routing update packet may be generated that is communicated to a WAN orchestrator of one or more routers of the computing network. Once obtained, the WAN orchestrator may forward the request to the one or more individual routers associated with IP address. Here, when a threat is identified related to a compute node of compute nodes 123, configuration service 150 may generate a packet for the WAN orchestrator indicating that a block should be implemented for communications related to at least the IP address of the compute node. Once obtained, the WAN orchestrator may implement the request using the routing protocol operations described herein or may use application programming interfaces (APIs) or a command line interface (CLI) to implement the required operation.

Figure 5A:
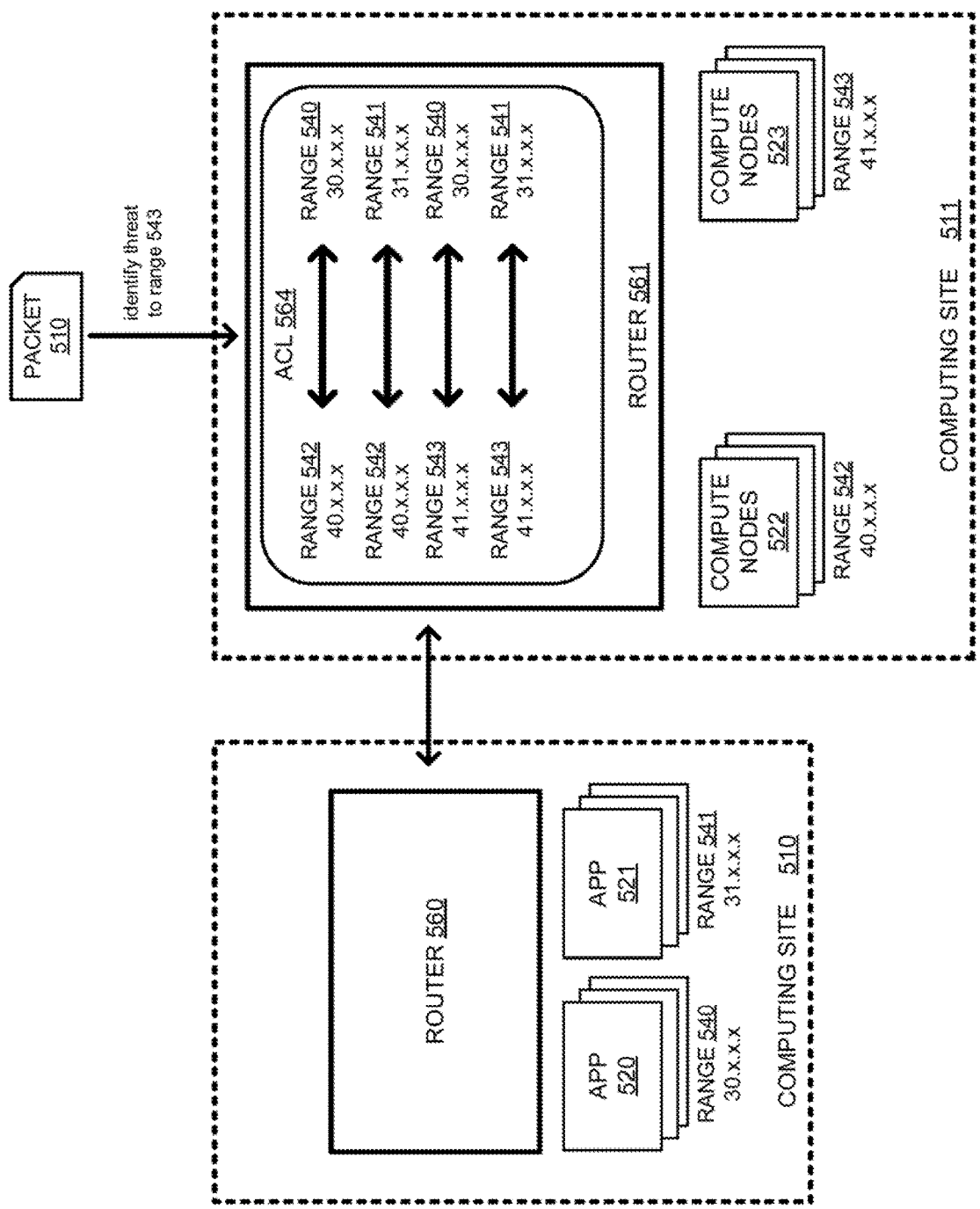
FIGS. 5A and 5B illustrates an update to an access control list of a router according to an implementation.
Figure 5B:
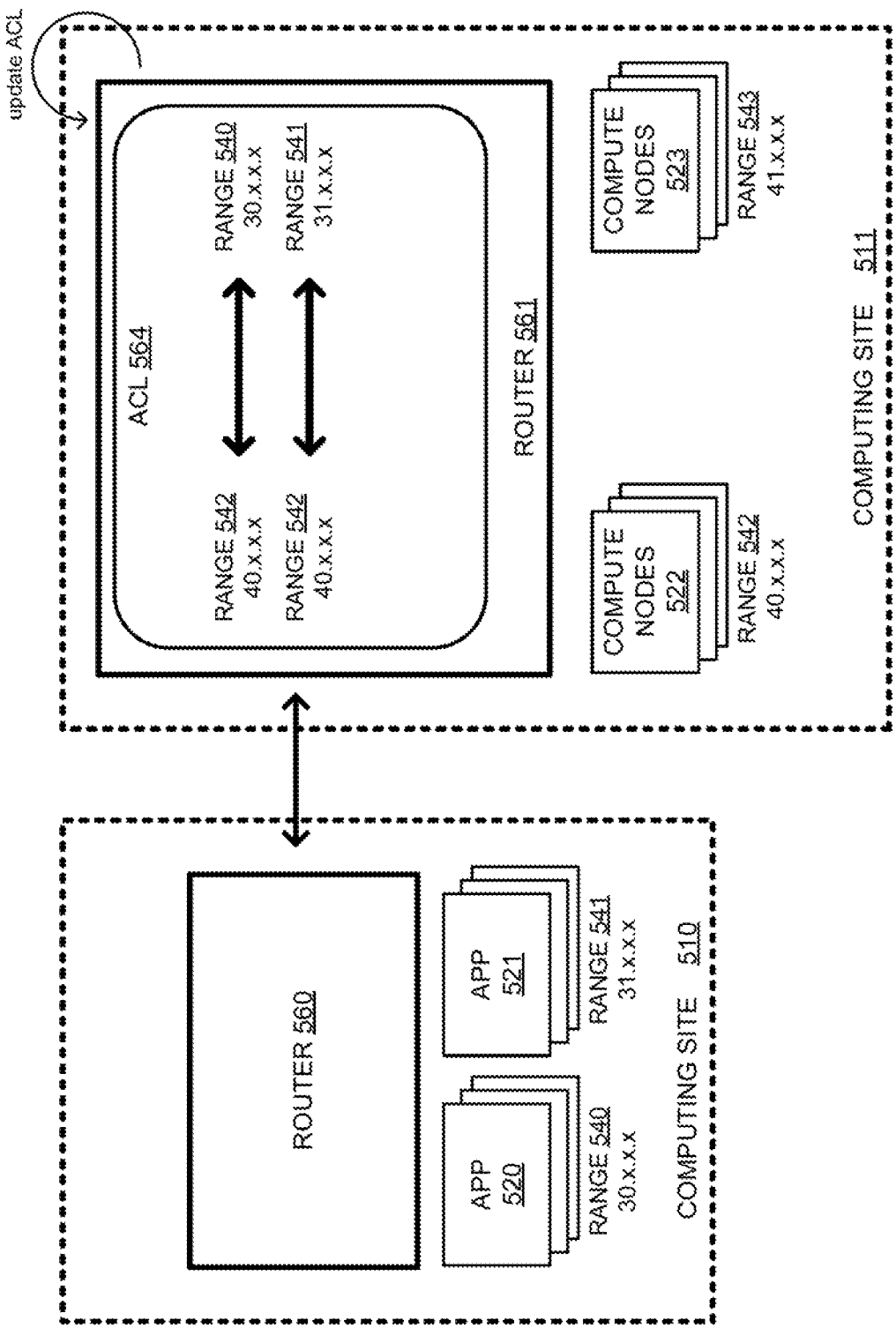

FIGS. 5A and 5B illustrates an update to an access control list of a router according to an implementation. FIGS. 5A and 5B include computing sites 510-511, wherein computing site 510 may represent a software defined data center in some examples, and computing site 511 may represent a branch of an organization that employs the software defined data center. Computing site 510 includes applications 520-521 and router 560 and computing site 511 includes router 561 and compute nodes 522-523. Compute nodes 522-523 may represent physical computing devices, virtual machines, containers, or some other similar compute nodes. Applications 520-521 correspond to address ranges 540-541, while compute nodes 522-523 correspond to address ranges 542-543.

In operation, compute nodes 522-523 may communicate with applications 520-521 to provide various operations for the compute nodes. These operations may comprise database operations, data processing operations, or some other similar operation. While communicating with computing site 510 using routers 560-561, packets may further be forwarded or mirrored to a security service or IDS that can identify traits of the packets and determine whether the packets pose a potential threat. When a threat is identified from an IP address, the security service may transfer a notification to a configuration service, which may operate in the software defined data center in some examples. Once provided, the configuration service may initiate a process to block future communications related to the affected IP address.

In one implementation, the configuration service may generate packet 510, wherein packet 510 may comprise routing update packet that can be used to update configuration lists of routers in the network. As an example, if a compute node in compute nodes 523 were identified as a potential threat based on network communications, the configuration service may generate packet 510 indicating that communications related to at least the affected compute node should be blocked. In some implementations, a single compute node may be blocked by updating ACL 564, however, as depicted in the example of FIG. 5B, packet 510 may indicate a subnet or range of IP addresses that should be blocked from future communications. As a result, ACL 564 is updated in Figure SB to reflect that range 543 is no longer available to communicate with applications 520-521 on computing site 510. Once ACL 564 is updated, any ingress or egress packets associated with compute nodes 523 may be blocked, as the list of approved communications no longer permits communications between that applications and compute nodes 523.

Figure 6:
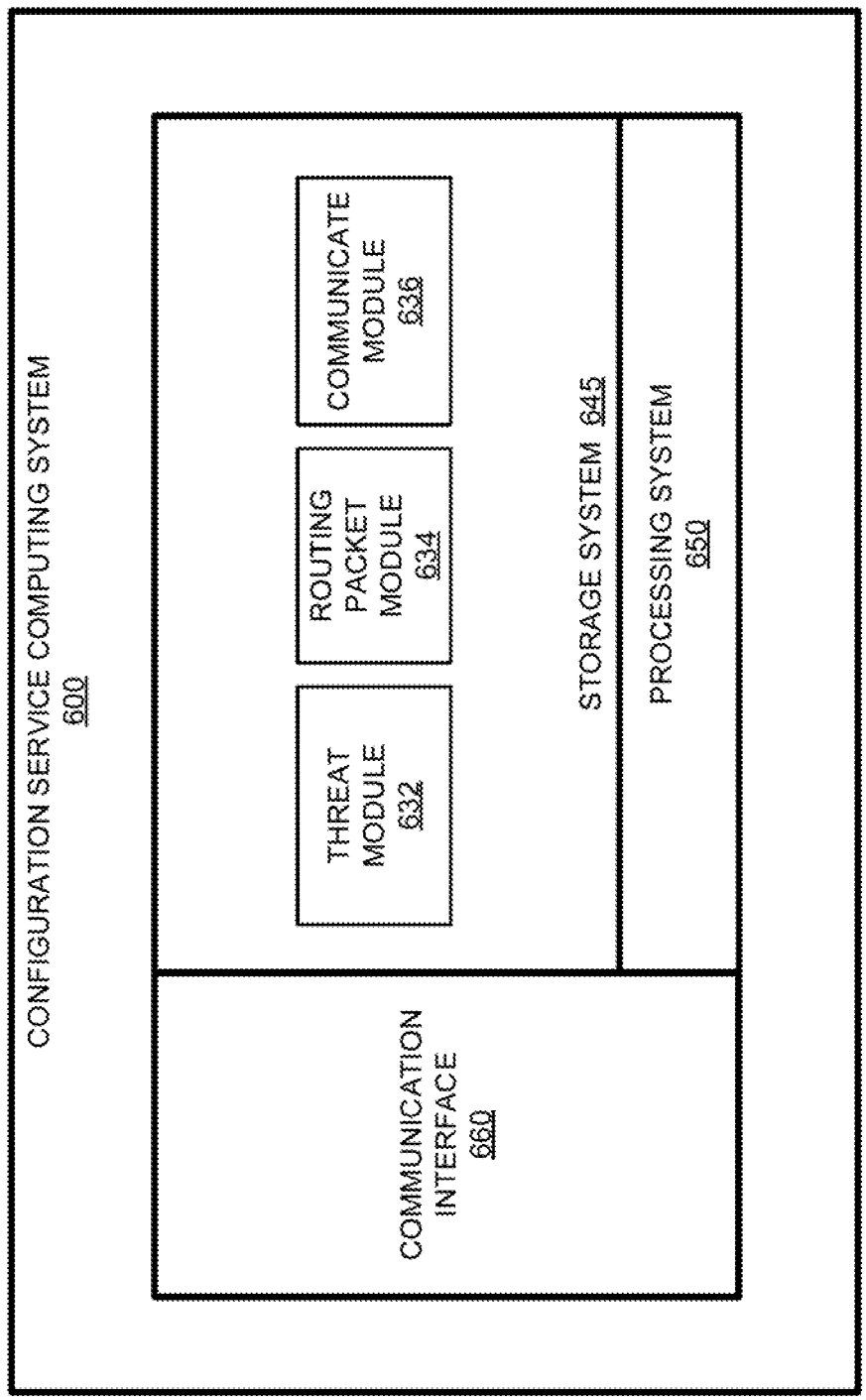
FIG. 6 illustrates a configuration service computing system according to an implementation.

In another implementation, rather than providing a routing update packet directly to a router associated with the affected IP address, the configuration service may instead communicate a routing update packet to a WAN orchestrator that can be used in configuring one or more of the routers in the network. This communication may indicate the IP address that is associated with the threat and may further indicate an IP address associated with the management of the router IP. Once received, the WAN orchestrator may generate a request for the corresponding router, in the present example router 561 to update a blocklist on router 561 or update any other accessibility list at router 561 to block the communications related to the affected IP address. In some implementations, the WAN orchestrator may block a single IP address, however, the WAN orchestrator may block all IP addresses within a subnet or range associated with the affected IP address FIG. 6 illustrates a configuration service computing system 600 according to an implementation. Computing system 600 is representative of any computing system or systems with which the various operational architectures, processes, scenarios, and sequences disclosed herein for a configuration service may be implemented. Computing system 600 is an example configuration service 150, although other examples may exist. Computing system 600 includes storage system 645, processing system 650, and communication interface 660. Processing system 650 is operatively linked to communication interface 660 and storage system 645. Communication interface 660 may be communicatively linked to storage system 645 in some implementations. Computing system 600 may further include other components such as a battery and enclosure that are not shown for clarity.

Communication interface 660 comprises components that communicate over communication links, such as network cards, ports, radio frequency (RF), processing circuitry and software, or some other communication devices. Communication interface 660 may be configured to communicate over metallic, wireless, or optical links. Communication interface 660 may be configured to use Time Division Multiplex (TDM), Internet Protocol (IP), Ethernet, optical networking, wireless protocols, communication signaling, or some other communication format—including combinations thereof. Communication interface 660 is configured to communicate with other routers in an organizations' computing network and may further be configured to communicate with a security service such as an IDS. Communication interface 660 may also be configured to communicate with a WAN orchestrator that is capable of managing the configuration of one or more routers in an organization WAN.

Processing system 650 comprises microprocessor and other circuitry that retrieves and executes operating software from storage system 645. Storage system 645 may include volatile and nonvolatile, removable and non-removable media implemented in any method or technology for storage of information, such as computer readable instructions, data structures, program modules, or other data. Storage system 645 may be implemented as a single storage device, but may also be implemented across multiple storage devices or sub-systems. Storage system 645 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 650 is typically mounted on a circuit board that may also hold the storage system. The operating software of storage system 645 comprises computer programs, firmware, or some other form of machine-readable program instructions. The operating software of storage system 645 comprises threat module 632, routing packet module 634, and communicate module 636. The operating software on storage system 645 may further include an operating system, utilities, drivers, network interfaces, applications, or some other type of software. When read and executed by processing system 650 the operating software on storage system 645 directs computing system 600 to operate as described herein.

In at least one implementation, threat module 632 directs processing system 650 to identify a threat associated with an IP address in a computing network or WAN for an organization. In some examples, the threat may be identified by an IDS that performs packet monitoring for the various packets that are communicated by branch routers to and from a centralized computing site or software defined data center. Once the threat is identified, the IDS may provide IP addressing information associated with the threat to computing system 600 where it is identified using threat module 632.

After a threat is identified, routing packet module 634 may generate a routing update packet that comprises a notification to block or otherwise prevent communications related to the affected IP address. Once generated, communicate module 636 may communicate the packet to at least the affected router. In some implementations, when the routing update packet is generated, routing packet module 634 may determine the corresponding router for the affected IP address. For example, computing system 600 may maintain one or more data structures that associated IP addresses of end compute nodes with routers that provide network connectivity for the end compute nodes. Based on the information, the routing update packet may be forwarded to the corresponding router of the compute node, wherein the compute node may implement the required operations to block future communications. These operations by the end router may include processing the received packet to identify the IP address or range of IP addresses to be blocked and updating one or more control lists in the router based on the IP addresses to block. Thus, if a range or subset of IP addresses were indicated in the packet to be blocked, the router may remove the IP address or addresses from a list of communications that are permitted or add the IP address or addresses to a list of communications that are blocked.

Although described in the previous example as forwarding the packet directly to the router that corresponds to the affected 1P address, it should be understood that computing system 600 may forward a packet or notification to a WAN orchestrator associated with the computing network for the organization, wherein the packet may identify the IP address associated with the threat and the IP address or other identifying information associated with configuring the corresponding router. Once obtained at the WAN orchestrator, the WAN orchestrator may implement the required action in the corresponding router. In implementing the action, the WAN orchestrator may use an API, a CLI, or may forward a routing update packet as described herein that includes information to block an affected IP address.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of implementing network configuration updates in a computing network, the computing network comprising a plurality of routers, the method comprising:
   identifying a threat from an internet protocol (IP) address, wherein the IP address corresponds to a compute node in the computing network;
   in response to identifying the threat, generating one or more routing update packets, the one or more routing update packets comprising a notification to block communications associated with a subnet that includes the IP address;
   identifying one or more routers in the plurality of routers associated with the subnet, wherein a router of the one or more routers is connected to the subnet; and
   communicating the one or more routing update packets to the one or more routers.

2. The method of claim 1 further comprising establishing a routing protocol session with the plurality of routers.

3. The method of claim 1, wherein identifying the threat related to the IP address comprises obtaining a notification of the threat from an intrusion detection system (IDS).

4. The method of claim 1, wherein the routing update packets comprise border gateway protocol packets.

5. The method of claim 1 further comprising:
   in the one or more routers, obtaining the one or more routing update packets;
   in response to obtaining the one or more routing update packets, processing the one or more routing update packets to identify at least the subnet; and
   updating at least one access control list (ACL) in the one or more routers based at least on the subnet.

6. The method of claim 1, wherein identifying the threat comprises identifying the threat in a software defined data center.

7. The method of claim 1 further comprising:
   in the one or more routers, obtaining the one or more routing update packets;
   in response to obtaining the one or more routing update packets, processing the one or more routing update packets to identify at least the subnet; and updating at least one list in the one or more routers to block communications associated with the subnet.

8. A computing apparatus comprising:
one or more non-transitory computer readable storage media;
a processing system operatively coupled to the one or more non-transitory computer readable storage media; and
program instructions stored on the one or more non-transitory computer readable storage media to update a computing network comprising a plurality of routers that, when executed by the processing system, direct the processing system to:
identify a threat from an internet protocol (IP) address, wherein the IP address corresponds to a compute node in the computing network;
in response to identifying the threat, generate one or more routing update packets, the one or more routing update packets comprising a notification to block communications associated with a subnet that includes the IP address;
identifying one or more routers in the plurality of routers associated with the subnet, wherein a router of the one or more routers is connected to the subnet; and
communicate the one or more routing update packets to the one or more routers.

9. The computing apparatus of claim 8, wherein the program instructions further direct the processing system to establish a routing protocol session with the plurality of routers.

10. The computing apparatus of claim 8, wherein identifying the threat related to the IP address comprises obtaining a notification of the threat from an intrusion detection system (IDS).

11. The computing apparatus of claim 8, wherein the routing update packets comprise border gateway protocol packets.

12. The computing apparatus of claim 8, wherein the program instructions further direct the processing system to:
in the one or more routers, obtaining the one or more routing update packets;
in response to obtaining the one or more routing update packets, processing the one or more routing update packets to identify at least the subnet; and
updating at least one access control list (ACL) in the one or more routers based at least on the subnet.

13. The computing apparatus of claim 8, wherein identifying the threat comprises identifying the threat in a software defined data center.

14. The computing apparatus of claim 8, wherein the program instructions further direct the processing system to:
in the one or more routers, obtain the one or more routing update packets;
in response to obtaining the one or more routing update packets, process the one or more routing update packets to identify at least the subnet; and
update at least one list in the one or more routers to block communications associated with the subnet.

15. An apparatus comprising:
one or more non-transitory computer readable storage media; and
program instructions stored on the one or more non-transitory computer readable storage media to update a computing network comprising a plurality of routers that, when executed by the processing system, direct the processing system to:
identify a threat related to an internet protocol (IP) address, wherein the IP address corresponds to a compute node in the computing network;
in response to identifying the threat, generate one or more routing update packets, the one or more routing update packets comprising a notification to block communications associated with a subnet that includes the IP address;
identify a router of the plurality of routers connected to the subnet; and
communicate the one or more routing update packets to the router one.

16. The apparatus of claim 15, wherein identifying the threat related to the IP address comprises obtaining a notification of the threat from an intrusion detection system (IDS).

17. The apparatus of claim 15, wherein identifying the threat comprises identifying the threat in a software defined data center.

18. The apparatus of claim 15, wherein the program instructions further direct the processing system to:
in the router, obtain the one or more routing update packets;
in response to obtaining the one or more routing update packets, process the one or more routing update packets to identify at least the subnet; and
update at least one list on the router to block communications associated with the subnet.

* * * * *